(12) United States Patent
Salem et al.

(10) Patent No.: US 10,864,572 B2
(45) Date of Patent: Dec. 15, 2020

(54) IN-SITU HOT WORKING AND HEAT TREATMENT OF ADDITIVELY MANUFACTURED METALLIC ALLOYS

(71) Applicant: MRL MATERIALS RESOURCES LLC, Beavercreek, OH (US)

(72) Inventors: Ayman A. Salem, Beavercreek, OH (US); Daniel P. Satko, Centerville, OH (US)

(73) Assignee: MRI. Materials Resources LLC, Beavercreek, OH (US)

( * ) Notice: Subject to any disclaimer, the term of this patent is extended or adjusted under 35 U.S.C. 154(b) by 62 days.

(21) Appl. No.: 16/269,826

(22) Filed: Feb. 7, 2019

(65) Prior Publication Data

US 2019/0255594 A1 Aug. 22, 2019

Related U.S. Application Data

(60) Provisional application No. 62/627,485, filed on Feb. 7, 2018.

(51) Int. Cl.
*B21J 5/00* (2006.01)
*B22F 3/17* (2006.01)
(Continued)

(52) U.S. Cl.
CPC ............ *B21J 5/002* (2013.01); *B22F 3/008* (2013.01); *B22F 3/17* (2013.01); *B29C 64/118* (2017.08);
(Continued)

(58) Field of Classification Search
CPC .... B22F 3/17; B22F 3/18; B22F 3/008; B22F 2003/175; B21J 5/002; B33Y 40/20
See application file for complete search history.

(56) References Cited

U.S. PATENT DOCUMENTS

| 5,301,863 A | 4/1994 | Prinz et al. |
| 6,338,765 B1 | 1/2002 | Statnikov |

(Continued)

FOREIGN PATENT DOCUMENTS

| GB | 2508335 A | 6/2014 |
| JP | 2012214885 A | * 11/2012 |

(Continued)

OTHER PUBLICATIONS

Machine Translation of JP 2012-214885 A (Year: 2012).*

*Primary Examiner* — Christopher J Besler
(74) *Attorney, Agent, or Firm* — Thomas E. Lees, LLC

(57) ABSTRACT

A hybrid manufacturing system comprises a workpiece platform, a heater, a material deposition system, a mechanical forming device, and a controller. The controller is operatively programmed to control the material deposition system to lay a track of material according to the three-dimensional representation of the object and control the mechanical forming device and the heater to apply mechanical force to a targeted portion of the object while the targeted portion of the object is maintained at a hot working temperature. The mechanical impact closes porosity of material within the targeted portion of the object, changes the microstructure within the targeted portion of the object, or both, and the mechanical impact causes a shape change within the targeted portion of the object. The controller still further computes a correction for a next track to be laid by the material deposition system based upon the shape change caused by the mechanical impact.

12 Claims, 4 Drawing Sheets

(51) Int. Cl.
  *B33Y 40/00*    (2020.01)
  *B22F 3/00*     (2006.01)
  *B29C 64/118*   (2017.01)
  *B29C 64/295*   (2017.01)
  *B33Y 10/00*    (2015.01)
  *B33Y 30/00*    (2015.01)

(52) U.S. Cl.
  CPC .............. *B29C 64/295* (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 2013/0197683 A1 | 8/2013 | Zhang et al. |
| 2014/0255198 A1 | 9/2014 | El-Wardany et al. |
| 2014/0334924 A1 | 11/2014 | Satzger et al. |
| 2014/0367894 A1 | 12/2014 | Kramer et al. |
| 2015/0360289 A1* | 12/2015 | Liou ............... B22F 3/1055 419/28 |
| 2017/0326681 A1 | 11/2017 | Sidhu et al. |
| 2019/0001655 A1* | 1/2019 | Blom ............... B33Y 30/00 |

FOREIGN PATENT DOCUMENTS

| | | |
|---|---|---|
| WO | 2012/152259 A1 | 11/2012 |
| WO | 2013/140147 A1 | 9/2013 |
| WO | 2014/072699 A1 | 5/2014 |
| WO | 2014/094882 A1 | 6/2014 |
| WO | 2016/092253 A1 | 6/2016 |

* cited by examiner

IN-SITU HOT WORKING AND HEAT TREATMENT OF ADDITIVELY MANUFACTURED METALLIC ALLOYS

CROSS REFERENCE TO RELATED APPLICATIONS

This application claims the benefit of U.S. Provisional Patent Application Ser. No. 62/627,485, filed Feb. 7, 2018, entitled "IN-SITU HOT WORKING AND HEAT TREATMENT OF ADDITIVELY MANUFACTURED METALLIC ALLOYS", the disclosure of which is hereby incorporated by reference.

BACKGROUND

Various aspects of the present disclosure relate generally to additive manufacturing, and more particularly, to additive manufacturing including in-situ hot working thermomechanical processing and heat treatment.

Various manufacturing techniques and technologies exist for the manufacture of three-dimensional parts. Most recently, a collection of technologies, generally referred to as "additive manufacturing" has emerged as an effective way to manufacture limited quantities of parts. In general, additive manufacturing techniques synthesize three-dimensional part by forming each part in successive layers. The layers are formed under computer control based upon a data file, e.g., a digital model data file, three-dimensional model file, Additive Manufacturing File (AMF) etc. In this manner, a part can be manufactured exhibiting virtually any shape or geometry that can be adequately characterized in the corresponding data file describing the part.

BRIEF SUMMARY

According to aspects of the present disclosure, a hybrid manufacturing system is provided. The hybrid manufacturing system comprises a workpiece platform upon which an object on the workpiece platform is manipulated, and a heater configured to heat at least a portion of the object on the workpiece platform. The hybrid manufacturing system also comprises a material deposition system for depositing material on the workpiece platform, and a mechanical forming device controllable to selectively deform a designated portion of the object being built on the workpiece platform. The hybrid manufacturing system still further comprises a controller that executes a program to perform a manufacturing operation on the object situated on the workpiece platform based upon a three-dimensional representation of the object. In particular, the controller is operatively programmed to control the material deposition system to lay a track of material according to the three-dimensional representation of the object. The controller is also operatively configured to control the mechanical forming device to apply mechanical force to a targeted portion of the object while the heater is controlled to maintain the targeted portion of the object at a hot working temperature. Here, the mechanical force closes porosity of material within the targeted portion of the object, changes the microstructure within the targeted portion of the object, or both. Also, the mechanical force causes a shape change within the targeted portion of the object. The controller still further computes a correction for a next track to be laid by the material deposition system based upon the shape change caused by the applied mechanical force.

According to further aspects of the present disclosure herein, a process of controlling an additive manufacturing process is disclosed. The process can be used to perform an operation on an object situated on a workpiece platform based upon a three-dimensional representation of the object, by controlling a material deposition system to lay a track of material according to the three-dimensional representation of the object. The process further comprises controlling a mechanical forming device to apply mechanical force to a targeted portion of the object while controlling a heater to maintain the targeted portion of the object at a hot working temperature. Under this arrangement, the applied mechanical force closes porosity of material within the targeted portion of the object, changes the microstructure within the targeted portion of the object, or both. Also, the applied mechanical force causes a shape change within the targeted portion of the object. The process also comprises computing a correction for a next track to be laid by the material deposition system based upon the shape change caused by the applied mechanical force.

DETAILED DESCRIPTION

Modern manufacturing processes, e.g., additive manufacturing, provide a flexible and convenient way to manufacture a part on demand. Added convenience and flexibility is brought about because the additive manufacturing machine manufactures an instance of the desired part based upon instructions received from additive manufacturing control code. Whereas additive manufacturing can reliably and repeatedly manufacture parts that have a desired appearance, current additive manufacturing techniques fall short and are unable to adequately control the microstructural properties of a desired part.

However, aspects of the present disclosure remediate or at least mitigate issues with conventional additive manufacturing processes by combining additive manufacturing operations with techniques that eliminate or reduce porosities and control microstructure/properties. In particular, aspects herein provide synchronized additive manufacturing (AM) and thermomechanical processing (TMP), which can eliminate post processing otherwise required to close porosities using techniques such as a hot isostatic press (HIP).

According to aspects of the present disclosure, in-situ heating and hot working processes are incorporated into additive manufacturing processes to dynamically modify object properties as the object is being built.

Example System

Figure 1:
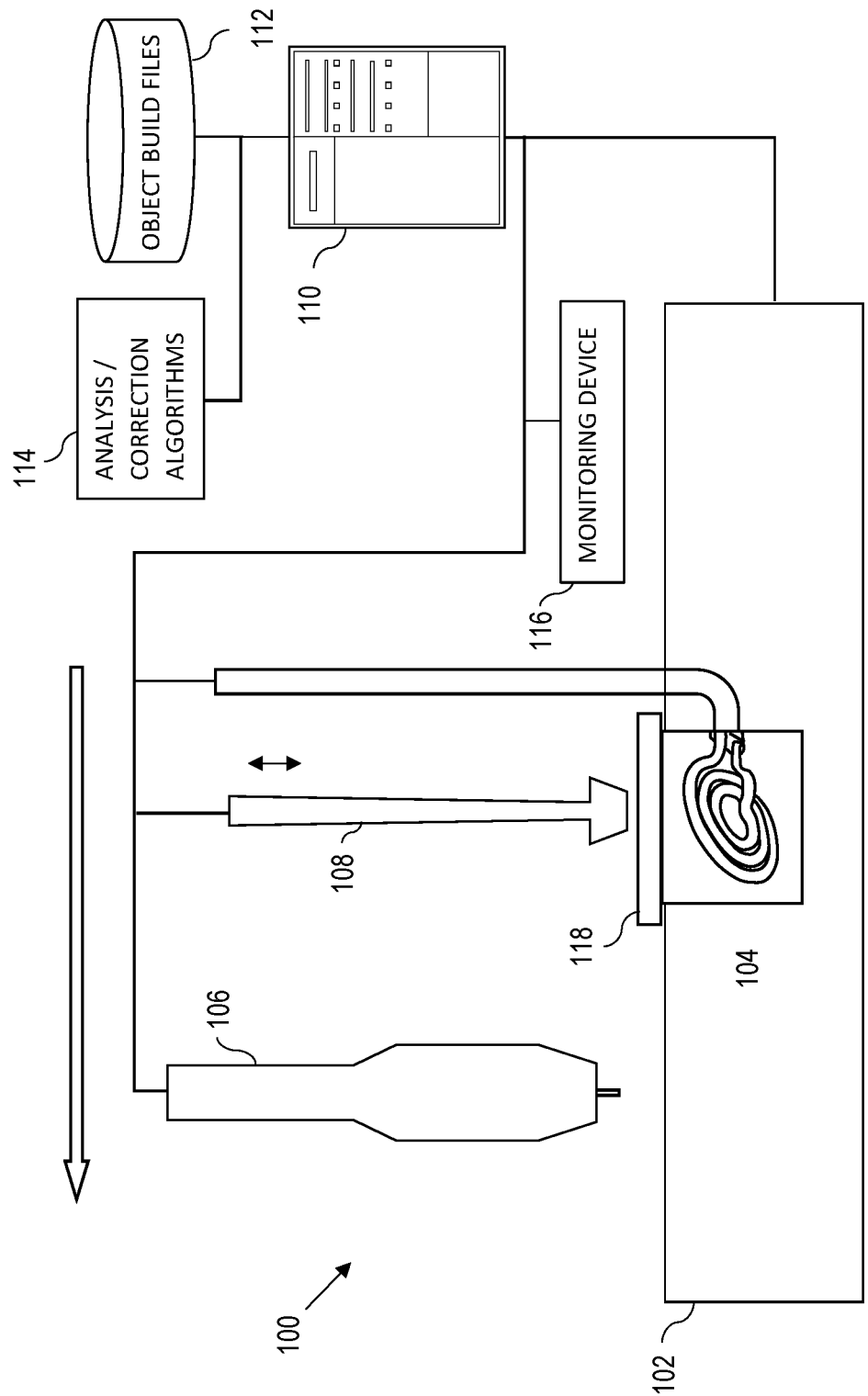
FIG. 1 is schematic diagram of a hybrid manufacturing system as described more fully herein.

Referring to the drawings, and in particular to FIG. 1, a hybrid manufacturing system 100 is illustrated, which combines an additive manufacturing process with an in-situ hot working thermomechanical processing, heat treatment process, or combination thereof.

In particular, the hybrid manufacturing system 100 includes a workpiece platform 102. The workpiece platform 102 serves as a location upon which an object is manipulated. Typically, the object is created from scratch on the workpiece platform 102. However, the workpiece platform 102 can also be used to support an object that is to be repaired, modified, etc. Although shown in schematic form for sake of clarity, the workpiece platform can comprise a motorized translation stage, offering movement in X, Y, Z, combinations thereof, etc. dimensions.

The hybrid manufacturing system 100 also includes a heater 104, which is configured to heat at least a portion of the object on the workpiece platform 102. For instance, the heater 104 is illustrated as heating coils positioned under the object on the workpiece platform 102. However, in practice, the heater 104 can be implemented in other manners, so long as the object can be heated as described more fully herein.

The hybrid manufacturing system 100 further includes a material deposition system 106 for depositing material on the workpiece platform 102. In practice, any additive manufacturing technique can be used, including by way of illustration, but not by way of limitation, wire additive manufacturing, powder bed fusion, etc. The material deposition system 106 is shown schematically for sake of clarity of discussion herein. In practice, the material deposition system 106 can include a powder bed, a powder delivery system that feeds powder towards the workpiece platform 102 via a nozzle, or other suitable configuration. Moreover, the material deposition system 106 can include an energy source (e.g., laser, electron beam, melting torch, etc.).

The hybrid manufacturing system 100 yet further includes a mechanical forming device 108 that is controllable to selectively apply mechanical force to a designated portion of the object being manipulated on the platform.

The hybrid manufacturing system 100 still further includes a controller 110. The controller 110, e.g., a computer, is operatively programmed to execute a program to perform a manufacturing operation, e.g., to build an object on the workpiece platform 102, to repair or modify an object situated on the workpiece platform 102, etc., based upon a three-dimensional representation of the object. For instance, the controller 110 may be connected to an object build file data source 112 that includes a data file, e.g., a digital model data file, three-dimensional model file, Additive Manufacturing File (AMF), computer aided design (CAD) file, or other computer file that represent the build instructions to cause the system to build and/or modify the object.

In practice, the controller 110 controls control the material deposition system 106 to lay a track of material according to the three-dimensional representation of the part, e.g., based upon a job file extracted from the object build file data source 112. As used herein, the expression "lay a track" is to be interpreted broadly to correspond to an additive manufacturing operation on a layer or layers. The exact manner in which a track is laid (or a layer is otherwise formed) will depend upon the precise additive manufacturing technique integrated with the in-situ working thermomechanical processing and heat treatment described more fully herein.

The controller 110 also controls the heating device 104 in cooperation with control of the mechanical forming device 108 to apply mechanical force to a targeted portion of the object while the targeted portion of the object is maintained at a hot working temperature. In certain embodiments, "hot working process" and "hot working temperature" refer to working material where metals are plastically deformed above their recrystallization temperature. Being above the recrystallization temperature allows the material to recrystallize during deformation. Notably, recrystallization keeps the materials from strain hardening, which ultimately keeps the yield strength and hardness low and ductility high. Comparatively, hot working is different from cold working/cold forming, which shapes a workpiece at a temperature below its recrystallization temperature. In some embodiments, the controller 110 controls the heater 104 to maintain the targeted portion of the object at a hot working temperature by maintaining the temperature of the targeted portion of the object at a temperature above the ambient environmental temperature, e.g., above room temperature.

According to aspects herein, the mechanical force closes porosity of material within the targeted portion of the object, changes the microstructure within the targeted portion of the object, or both. In certain embodiments, the mechanical forming device 108 can be characterized as a forge processing device, and can take advantage of forge techniques, including hammering.

According to certain embodiments, the mechanical forming device 108 can include a hammer. The controller 110 controls the hammer (mechanical forming device 108) simultaneously or otherwise in cooperation with control of the heater 104 to keep the material of the object (at least within the targeted portion) in hot working condition. The controller 110 can also use the heater 104 to control the cooling rate. In practical applications, the controller 110 uses the in-situ hot working phase of manufacturing to close porosities, change the microstructure of the targeted portion of the object, or combinations thereof. In this regard, the controller 110 enables a hybrid manufacturing system 100 that performs in-situ pressing and hot working, and is referred to herein as in situ HUP (hot upset pressing) as a modification for HIP (hot isostatic pressing).

According to certain aspects of the present disclosure, the forging tool size/shape depends on the size of a corresponding volume of material to be manipulated. For instance, referring to FIG. 2, a generally large weld nugget, which is formed in the additive manufacturing of the object is shown using a correspondingly wide mechanical forming device 108a. Referring to FIG. 3, a relatively smaller weld nugget, which is formed in the additive manufacturing of the object is shown using a correspondingly smaller mechanical forming device 108b.

Referring back to FIG. 1, in certain embodiments, the mechanical forming device 108 can apply mechanical force, including causing deformation of at least a portion of the object, using non-hammer techniques, including by way of example, but not by way of limitation, implemented as a hot roll device, hot peen device, hot bend device, etc.

In still further embodiments, the hybrid manufacturing system 100 comprises a plurality of mechanical forming devices 108 such that any combination of hammering, rolling, extrusion, bending, peening, and other physical contact/physical impact techniques can be utilized as the application dictates. Here, each individual mechanical forming device 108 can be utilized and can be individually controlled by the controller 110 to apply mechanical force as the controller 110 determines is necessary. As such, hammers of various size, rollers of various size, etc., can be integrated to provide a flexible hybrid manufacturing system 100 capable of manufacturing and/or repairing a wide variety of objects.

Moreover, various pressures, impacts, and other forms of mechanical force can be controlled to adjust the porosity/microstructure of the object.

The mechanical impact causes a shape change, e.g., a deformation, within the targeted portion of the object. As such, the controller 110 corrects the build file so as to account for the shape changes made by the mechanical forming device 108. As such, the system 100 can include one or more analysis/correction algorithms 114 that are utilized to compute a correction for a next track to be laid by the material deposition system 106 based upon the shape change caused by the mechanical impact.

By way of example, the analysis/correction algorithms 114 can utilize phase diagrams and intended properties to change build operation instructions. In some embodiments, the changes implemented by the analysis/correction algorithms 114 are dynamic and vary as the object is manipulated. In some embodiments, the analysis/correction algorithms 114 are carried out by implementing a densification algorithm and hot working algorithm.

In example embodiments, correction algorithms 114 are used to predict the amount of deformation needed to close porosities and change microstructure, the heat needed to achieve this, and the time needed for heat and force applied to achieve the desired microstructure that is free of defects. Under this configuration, the controller 110 uses the prediction for controlling a mechanical forming device to apply mechanical force to a targeted portion of the object, for controlling the heater to maintain the targeted portion of the object at a hot working temperature, or a combination thereof.

In some embodiments, an optional monitoring device 116, e.g., sensor, measurement device, etc., can be used to track and measure the shape change so that a suitable correction is computed by the analysis/correction algorithms 114. In yet other embodiments, a combination of analysis/correction algorithms 114 and an optional monitoring device 116 are utilized to control the amount of deformation needed to close porosities and change microstructure, the heat needed to achieve the changes, and the time needed for heat and force applied to achieve the desired microstructure that is free of defects.

Processing

Figure 4:
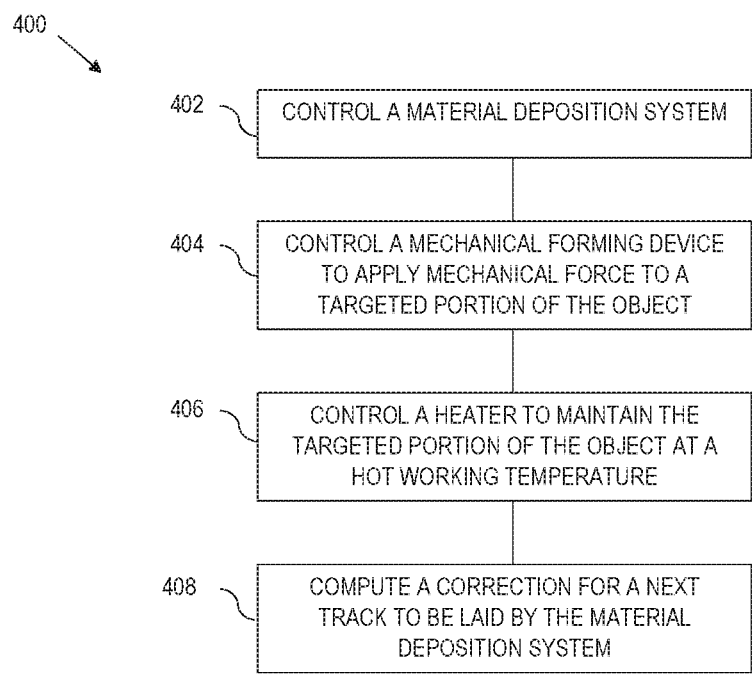
FIG. 4 is a flow chart illustrating a process for controlling an additive manufacturing operation.

Referring to FIG. 4, a process of controlling an additive manufacturing process 400 is provided. The process 400 can be used to perform an operation on an object situated on a workpiece platform based upon a three-dimensional representation of the object, by controlling at 402, a material deposition system to lay a track of material according to the three-dimensional representation of the object.

The process 400 also comprises controlling at 404, a mechanical forming device to apply mechanical force to a targeted portion of the object while controlling a heater to maintain the targeted portion of the object at a hot working temperature. In certain embodiments, the applied mechanical force closes porosity of material within the targeted portion of the object, changes the microstructure within the targeted portion of the object, or both, and the applied mechanical force causes a shape change within the targeted portion of the object.

The process 400 also comprises computing at 408, a correction for a next track to be laid by the material deposition system based upon the shape change caused by the applied mechanical force.

Figure 2:
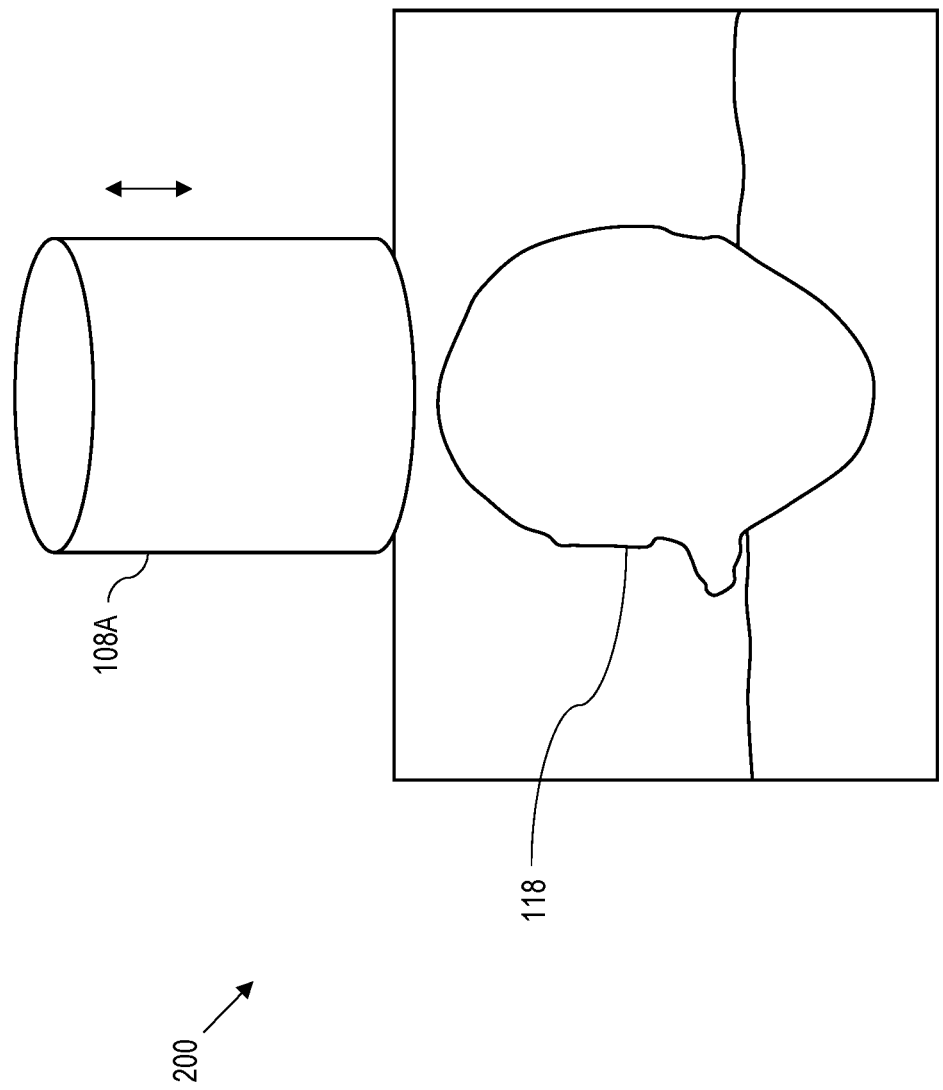
FIG. 2 is an example workpiece and corresponding mechanical forming device.
Figure 3:
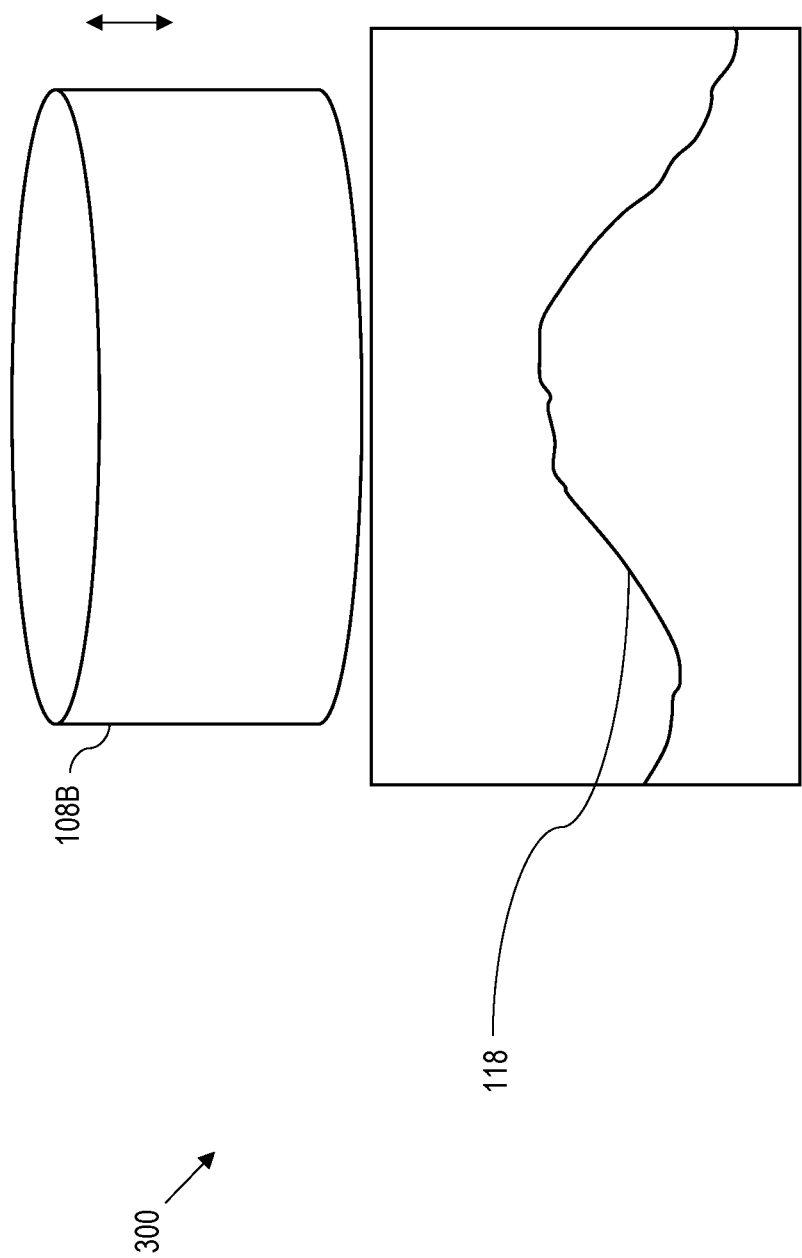
FIG. 3 is another example workpiece and corresponding mechanical forming device.

The details of the process 400 can comprise any one or more of the features set out more fully herein in the discussion of FIG. 1-FIG. 3.

Miscellaneous

According to certain aspects herein, the mechanical forming device 108 comprises one or more forming tools. Each forming tool is designed to impose in-situ small plastic deformation on a volume that is the size of the melt pool. Thus, it is independent of the build part. The size could change based on the melting process (i.e. welding setup). However, in practical applications, once optimized for a specific material and production rate, the size of the weld bead and hence the size of the forging tool can be fixed. Regardless of tool type, the mechanical forming device 108 follows the melt pool and imposes hot deformation to close pores and/or control microstructure. The optimization of the thermomechanical process and timing controlled based upon the desired materials properties.

In an example implementation of large area additive manufacturing, a mechanical deformation device can be implemented with a wire Arc welding (MIG or TIG) device. Here, the hot deformation tool is being implemented as hammer forging with a deformation volume in the material that is larger than the volume of the solidified melt pool. Here, integrated computational adaptive additive manufacturing (iCAAM) can be used to perform optimizations based on properties/microstructure relationship.

In practical applications, in-situ heating is utilized for wire additive manufacturing for large area scans using induction coils. In alternative embodiments, additive manufacturing can be carried out using powder bed fusion, which may be better suited for certain types of parts. Using the above-techniques, shapes up to 1 cubic foot (0.028 cubic meters) or larger can be constructed. Practical size limitation is dictated by the dimensions of the workpiece platform 102 (e.g., X,Y,Z stage) and/or rotation table holding the part. Practical large area additive manufacturing as set out herein can accommodate and scale up to meters if the workpiece platform is sized accordingly.

In practical applications, there are no extra size limitations from adding the in situ thermomechanical forging operation since it follows the melt pool. As long as there is space on the workpiece platform, e.g., an X,Y,Z stage, to accommodate the heater 104, material deposition system 106 (e.g., incorporating a welding torch), and the mechanical forming device 108 (e.g., hammer).

Certain embodiments herein take advantage of additive manufacturing capabilities to manufacture unique geometries, whereas the hot working techniques provide porosity elimination/microstructure control. Here, techniques can build and forge one weld nugget at a time. The in-situ additive manufacturing combined with hot forging is expected to reduce the cost of additive manufacturing drastically to achieve mechanical properties better than casting and close to wrought alloys. The in-situ additive manufacturing combined with hot forging is also expected to eliminate the need of HIP which results in major time and cost savings.

MISCELLANEOUS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A hybrid manufacturing system, comprising:
  a workpiece platform upon which an object on the workpiece platform is to be manipulated;
  a heater configured to heat at least a portion of the object on the workpiece platform;
  a material deposition system for depositing material on the workpiece platform;
  a mechanical forming device controllable to selectively deform a designated portion of the object being built on the workpiece platform; and
  a controller configured to execute a program to perform a manufacturing operation on the object situated on the workpiece platform based upon a three-dimensional representation of the object, wherein the controller is operatively programmed to:
    control the material deposition system to lay a track of material according to the three-dimensional representation of the object;
    control the mechanical forming device to apply mechanical force to a targeted portion of the object while a heater is controlled to maintain the targeted portion of the object at a hot working temperature, wherein:
      the applied mechanical force closes porosity of material within the targeted portion of the object, changes the microstructure within the targeted portion of the object, or both; and
      the applied mechanical force causes a shape change within the targeted portion of the object; and
    compute a correction for a next track to be laid by the material deposition system based upon the shape change caused by the applied mechanical force comprising utilizing phase diagrams and intended properties to change the applied mechanical force for the next track.

2. The hybrid manufacturing system according to claim 1, wherein the controller controls the heater to maintain the targeted portion of the object at a hot working temperature by maintaining the temperature of the targeted portion of the object at a temperature above the ambient environmental temperature.

3. The hybrid manufacturing system according to claim 1, wherein the mechanical forming device is a hammer.

4. The hybrid manufacturing system according to claim 1, wherein the mechanical forming device is a select one of a hot roll device, hot peen device, and hot bend device.

5. The hybrid manufacturing system according to claim 1 further comprising a plurality of the mechanical forming devices, each of the plurality of mechanical forming devices individually controlled by the controller to apply mechanical force as the controller determines is necessary.

6. A process of controlling an additive manufacturing process to perform an operation on an object situated on a workpiece platform based upon a three-dimensional representation of the object, by:
  controlling a material deposition system to lay a track of material according to the three-dimensional representation of the object;
  controlling a mechanical forming device to apply mechanical force to a targeted portion of the object while controlling a heater to maintain the targeted portion of the object at a hot working temperature, wherein:
    the applied mechanical force closes porosity of material within the targeted portion of the object, changes the microstructure within the targeted portion of the object, or both; and
    the applied mechanical force causes a shape change within the targeted portion of the object; and
  computing a correction for a next track to be laid by the material deposition system based upon the shape change caused by the applied mechanical force comprising utilizing phase diagrams and intended properties to change the applied mechanical force for the next track.

7. The process of claim 6, wherein controlling a heater to maintain the targeted portion of the object at a hot working temperature comprises:
  controlling the heater to maintain the targeted portion of the object at a temperature that is above the ambient environmental temperature.

8. The process of claim 6, wherein controlling a heater to maintain the targeted portion of the object at a hot working temperature comprises:
  controlling the heater to maintain the targeted portion of the object at a temperature that is above the recrystallization temperature of the material used to manipulate the object.

9. The process of claim 6, wherein controlling a mechanical forming device to apply mechanical force to a targeted portion of the object while controlling a heater to maintain the targeted portion of the object at a hot working temperature comprises controlling the mechanical forming device simultaneously with control of the heater to keep the material of the object at least within the targeted portion, in hot working condition.

10. The process of claim 6 further comprising:
  predicting the amount of deformation needed to close porosities and change microstructure, the heat needed to achieve this, and the time needed for heat and force applied to achieve the desired microstructure that is free of defects, and
  using the prediction for controlling a mechanical forming device to apply mechanical force to a targeted portion of the object.

11. The process of claim 10 further comprising:
  using the prediction for also controlling the heater to maintain the targeted portion of the object at a hot working temperature.

12. The process of claim 6 further comprising implementing a densification algorithm and hot working algorithm to make adjustments to the object being manipulated.

* * * * *

UNITED STATES PATENT AND TRADEMARK OFFICE
CERTIFICATE OF CORRECTION

PATENT NO. : 10,864,572 B2  
APPLICATION NO. : 16/269826  
DATED : December 15, 2020  
INVENTOR(S) : Ayman A. Salem et al.

Page 1 of 1

It is certified that error appears in the above-identified patent and that said Letters Patent is hereby corrected as shown below:

On the Title Page

Item (73) Assignee:
"MRI. Materials Resources LLC, Beavercreek, OH (US)"
Should read:
--MRL Materials Resources LLC, Beavercreek, OH (US)--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*